(12) United States Patent
Gillant et al.

(10) Patent No.: US 9,982,546 B2
(45) Date of Patent: May 29, 2018

(54) PART TO MODIFY THE PROFILE OF AN AERODYNAMIC JET

(71) Applicant: SNECMA, Paris (FR)

(72) Inventors: Gregory Nicolas Gerald Gillant, Mennecy (FR); Sylvain Dousseaud, Savigny le Temple (FR); Stephane Clemot, Vaux le Penil (FR)

(73) Assignee: SNECMA, Paris (FR)

( * ) Notice: Subject to any disclaimer, the term of this patent is extended or adjusted under 35 U.S.C. 154(b) by 489 days.

(21) Appl. No.: 14/413,508

(22) PCT Filed: Jul. 24, 2013

(86) PCT No.: PCT/FR2013/051782
§ 371 (c)(1),
(2) Date: Jan. 8, 2015

(87) PCT Pub. No.: WO2014/016515
PCT Pub. Date: Jan. 30, 2014

(65) Prior Publication Data
US 2015/0176419 A1      Jun. 25, 2015

(30) Foreign Application Priority Data
Jul. 27, 2012 (FR) .................................... 12 57321

(51) Int. Cl.
*F01D 9/02* (2006.01)
*F01D 5/00* (2006.01)
(Continued)

(52) U.S. Cl.
CPC ................ *F01D 9/02* (2013.01); *B23P 6/005* (2013.01); *F01D 5/005* (2013.01); *F01D 5/143* (2013.01);
(Continued)

(58) Field of Classification Search
CPC . F01D 9/02; F01D 9/047; F01D 25/24; F01D 5/02; F01D 5/143; F01D 5/005;
(Continued)

(56) References Cited

U.S. PATENT DOCUMENTS 2,799,472 A * 7/1957 Rainbow ............... F01D 25/162
                                                                   138/40
2,844,001 A * 7/1958 Alford .................... F01D 5/145
                                                                   138/40
(Continued)

FOREIGN PATENT DOCUMENTS

| EP | 1 645 747 A2 | 4/2006 |
|----|---|---|
| EP | 1 992 787 A1 | 11/2008 |
| GB | 2482170 A | 1/2012 |

OTHER PUBLICATIONS

U.S. Appl. No. 14/322,180, filed Jul. 2, 2014, Dousseaud, et al.
(Continued)

*Primary Examiner* — Christopher Verdier
*Assistant Examiner* — Wayne A Lambert
(74) *Attorney, Agent, or Firm* — Oblon, McClelland, Maier & Neustadt, L.L.P.

(57) ABSTRACT

A part to modify the profile of an aerodynamic jet, including: a first face configured to be secured on the aerodynamic jet, and a second face defining a modified aerodynamic jet profile, configured to modify an initial profile of the aerodynamic jet.

16 Claims, 3 Drawing Sheets

(51) Int. Cl.
  *F01D 5/14* (2006.01)
  *B23P 6/00* (2006.01)
(52) U.S. Cl.
  CPC ...... *F05D 2230/31* (2013.01); *F05D 2230/80* (2013.01); *Y02T 50/673* (2013.01); *Y10T 29/49337* (2015.01)
(58) Field of Classification Search
  CPC ...... F01D 5/30; F01D 5/3007; F05D 2230/31; F05D 2230/80; F05D 2240/10; B23P 6/005; B23P 6/002; Y10T 29/49337; Y02T 50/673
  See application file for complete search history.

(56) References Cited

U.S. PATENT DOCUMENTS

| | | | | |
|---|---|---|---|---|
| 2,873,088 A * | 2/1959 | Neumann | ............ | F01D 5/3007 416/193 A |
| 3,393,862 A * | 7/1968 | Harrison | ............ | F01D 11/008 415/189 |
| 4,023,350 A | 5/1977 | Hovan et al. | | |
| 4,650,399 A * | 3/1987 | Craig | ............ | B23P 15/04 416/193 A |
| 4,726,101 A * | 2/1988 | Draghi | ............ | B22F 7/062 228/119 |
| 5,222,865 A * | 6/1993 | Corsmeier | ............ | F01D 11/008 416/193 A |
| 5,281,096 A * | 1/1994 | Harris | ............ | F01D 11/008 416/193 A |
| 5,935,360 A * | 8/1999 | Griggs | ............ | F01D 5/3092 156/94 |
| 6,561,761 B1 * | 5/2003 | Decker | ............ | F04D 29/681 415/173.1 |
| 6,652,228 B2 * | 11/2003 | Tiemann | ............ | F01D 5/225 415/178 |
| 7,665,964 B2 * | 2/2010 | Taylor | ............ | F01D 5/143 415/194 |
| 9,388,704 B2 * | 7/2016 | Lohaus | ............ | F01D 9/042 |
| 2008/0286109 A1 | 11/2008 | Keith et al. | | |
| 2008/0298973 A1 * | 12/2008 | Marini | ............ | F01D 5/147 416/223 R |
| 2009/0191049 A1 * | 7/2009 | Aubin | ............ | F01D 5/143 415/173.1 |
| 2009/0199565 A1 | 8/2009 | Brown et al. | | |
| 2013/0243602 A1 * | 9/2013 | Pernleitner | ............ | F01D 5/02 416/223 R |
| 2015/0017005 A1 | 1/2015 | Dousseaud et al. | | |

OTHER PUBLICATIONS

International Search Report dated Oct. 18, 2013, in PCT/FR13/051782 filed Jul. 24, 2013.
French Preliminary Search Report dated Apr. 18, 2013, in French Application No. 12 57321 filed Jul. 27, 2012.

* cited by examiner

PART TO MODIFY THE PROFILE OF AN AERODYNAMIC JET

TECHNICAL FIELD

The invention relates to the field of aerodynamic jets, and more specifically to those present in turbomachines. It relates to a part to modify the profile of an aerodynamic jet, the aerodynamic jet and the turbomachine comprising such a part, and to a method for modifying the profile of an aerodynamic jet.

The invention is particularly applicable to any type of land or aeronautical turbomachines, and especially to aircraft turbomachines such as turbojets and turboprops.

STATE OF PRIOR ART

In the field of aerodynamics, and more particularly in the field of turbomachines, aerodynamic jets are elements that allow the fluid flow, particularly air, to pass and be guided.

U.S. Pat. No. 4,023,350 A and patent applications US 2009/199565 A1, EP 1,992,787 A1 and GB 2,482,170 A illustrate, inter alia, the state of prior art.

Generally, especially whatever the type of turbomachines, the choices made for the design of aerodynamic jets have a direct influence on the performances of the engine, especially in terms of aerodynamic thrust, efficiency and acoustic performances. Therefore, most of the time, it is necessary to test several types of aerodynamic jets to achieve optimization of all the performances expected for the turbomachines.

An aerodynamic jet comprises, in a manner known per se, a set of elements called profiles of aerodynamic jets which are directly machined on the parts of the turbomachine carrying out the air flow, for instance ferrules. These elements define the general profile of the aerodynamic jet that allows guiding of the air flow. Consequently, aerodynamic jets are complex and expensive to produce. They also lead to very long production times. Particularly, the influence studies carried out on aerodynamic jets, which can lead to replace at least partially an aerodynamic jet already in place with a modified aerodynamic jet, are significant time and cost expenditure items in the development of a turbomachine.

DISCLOSURE OF THE INVENTION

There is thus a need for offering a new solution to modify the profile of a turbomachine aerodynamic jet, especially an aerodynamic jet already in place on the turbomachine. There is particularly a need for allowing modification of the profile of the aerodynamic jet easily and quickly.

The purpose of the invention is to solve at least partially the abovementioned needs and the drawbacks relative to prior art achievements.

The invention therefore relates, according to one of its aspects, to a part to modify the profile of an aerodynamic jet, especially a turbomachine aerodynamic jet, comprising:
  a first face intended to be secured on the aerodynamic jet, and
  a second face defining a modified aerodynamic jet profile, intended to modify the initial profile of the aerodynamic jet, and particularly to modify at least the initial axial profile of the aerodynamic jet.

"A part to modify" means an element for being assembled on the aerodynamic jet so as to modify its profile. The part to modify can also be called an insert or a "patch".

"Axial profile" means the profile or contour of the aerodynamic jet observed along the longitudinal axis of the turbomachine. "Initial axial profile" means the axial profile of the aerodynamic jet before positioning the part to modify.

The solution offered by the invention can allow various drawbacks of the known prior art solutions to be avoided while ensuring the desired modification(s) for the aerodynamic jet. Indeed, the part to modify according to the invention can allow, after securing on the aerodynamic jet, a desired modified profile of the aerodynamic jet relative to the initial profile thereof to be obtained.

Thanks to the invention, it is therefore possible to modify an aerodynamic jet quickly and at little cost, and without resorting to making new bulky parts, especially metal parts, and without having to disassemble and reassemble the turbomachine to replace the aerodynamic jet.

The part to modify according to the invention can also comprise one or several of the following characteristics taken independently or according to any possible technical combinations.

The part to modify can modify the initial axial profile of the aerodynamic jet on at least the major part thereof, preferably on at least the three fourths thereof, even substantially on the whole thereof.

The second face can define an aerodynamic jet profile which is modified, in other words different, relative to the profile of the portion of the aerodynamic jet on which the part to modify is to be secured by its first face.

The first face of the part can be able to fit closely the profile of at least one portion of the aerodynamic jet, especially the initial axial profile of at least one portion of the aerodynamic jet. Particularly, the first face of the part can be able to fit closely the profile of the portion of the aerodynamic jet on which it is to be secured. In other words, the first face can be designed so as to adjust exactly to the shape of the portion of the aerodynamic jet on which it is to be secured.

The second face of the part can be different from the first face. Particularly, the second face of the part can define an aerodynamic jet profile different from that defined by the first face.

Advantageously, the invention can therefore allow to provide a part to modify, one face of which is provided to perfectly fit the shape of the initial profile of the aerodynamic jet and another face of which is provided to achieve a new modified profile of the aerodynamic jet.

The part to modify can be secured to the aerodynamic jet by any kind of means, and especially through gluing. Particularly, the first face of the part to modify can be at least partially coated with a glue, intended to contact the aerodynamic jet.

The part to modify can further comprise at least one surface, different from the first face, coated with glue. Indeed, it can be possible that one or more other surfaces of the part, different from the first face, in contact with the aerodynamic jet become glued by the outlet of glue during the positioning of the part to modify on the aerodynamic jet. However, this situation can be favourable to maintain the part in position on the aerodynamic jet because of an increase of the glued surface.

The part to modify can include a groove (or housing) to receive a binding band for maintaining the part in position on the aerodynamic jet. Particularly, the second face of the part to modify can include such a groove.

The binding band can correspond to a very resistant strip used to maintain the part to modify in position on the aerodynamic jet.

Advantageously, in case where the part secured to the aerodynamic jet is unglued, a mechanical securing tie is maintained thanks to the binding band to ensure that the part is pressed against the aerodynamic jet.

The part to modify can be made of any type of material. Particularly, the part to modify can be made by a rapid prototyping method, especially by stereolithography. The part to modify can thus comprise for example a stereolithographic resin and/or a metallic powder.

The invention further relates, according to another of its aspects, to an aerodynamic jet, especially a turbomachine aerodynamic jet, characterised in that it includes a part to modify as defined above.

The aerodynamic jet can thus include a part to modify the first face of which is secured on the aerodynamic jet, especially by gluing, and the second face is opposite the first face and defines an aerodynamic jet profile that is modified relative to the initial profile of the portion of the aerodynamic jet on which the first face rests.

The aerodynamic jet can have an initial axial profile defined along the longitudinal axis of the turbomachine.

The part to modify the profile of the aerodynamic jet can extend along its largest dimension, on the aerodynamic jet, along the longitudinal axis of the turbomachine.

The aerodynamic jet can include several parts to modify according to the invention, especially at least two, even three, even four parts. These parts to modify can be at least partially arranged adjacent to and/or superimposed on each other.

Superimposing several parts to modify on top of each other can allow several layers to be formed, each layer constituting an influence of aerodynamic jet.

The adjacent arrangement of parts to modify on the aerodynamic jet can cause clearances between the parts to modify. These clearances can for example be compensated by adding material, especially to ensure proper tightness.

Positioning one or several parts to modify on the aerodynamic jet can allow the long and costly making of new metallic parts for replacing at least partially the jet profiles of the aerodynamic jet to be avoided, only the parts to modify having to be made.

The aerodynamic jet can include a plurality of parts to modify the profile of the aerodynamic jet, arranged in juxtaposition on top of each other transversely relative to the longitudinal axis of the turbomachine so as to ensure a substantial continuity of the modified profile of the aerodynamic jet on at least one transverse section of the aerodynamic jet.

Thanks to the invention, it is thus possible to modify the axial profile of the aerodynamic jet along the longitudinal axis of the turbomachine and ensure a substantial continuity of the modified profile transversely by using several parts to modify.

The aerodynamic jet can be any kind of aerodynamic jet provided on a turbomachine. For example, the aerodynamic jet can be a guide vane disk, especially an outlet guide vane (OGV) or an inlet guide vane (IGV).

The part(s) to modify according to the invention can be placed between the blades of the guide vane. Particularly, each part to modify can be sandwiched between two successive blades.

The invention also relates, according to another of its aspects, to a turbomachine characterised in that it includes a part to modify as defined above or an aerodynamic jet as defined above.

The turbomachine can include filtering means for the air that will come into contact with the part to modify. Indeed, the part to modify can be made of an abrasion-sensitive material, especially when made of a stereolithographic material, and the air filtering can allow the projection of abrasive particles on the part to modify to be prevented.

The part to modify can also be applied to an aerodynamic jet of a cold portion of the turbomachine. Particularly, the part to modify can be located in a cold area of the turbomachine, especially having a temperature equal or lower than 40° C. Indeed, above such a temperature, the material(s) constituting the part to modify may not be able to resist, particularly when it includes a stereolithographic material.

The invention also relates, according to another of its aspects, to a method for modifying the profile of an aerodynamic jet, especially a turbomachine aerodynamic jet, characterised in that it includes the step of securing a part to modify an aerodynamic jet such as defined above on the aerodynamic jet.

The method can include a step of smoothing at least at one intersection between the part to modify and the aerodynamic jet. The smoothing step can allow the aerodynamic jet profile to be continuously reproduced at an intersection between the part to modify and the aerodynamic jet.

The smoothing step can also be implemented at the intersection between two parts to modify according to the invention.

The smoothing step can further be implemented at the groove of the part to modify accommodating a binding band, particularly above the binding band to reconstitute the aerodynamic jet profile.

The smoothing step can for instance include the provision of an elastomer, particularly an RTV (Room Temperature Vulcanizing) silicone elastomer, at the intersection between the part to modify and the aerodynamic jet.

The method according to the invention can include the step of arranging adjacently and/or surperimposedly a plurality of parts to modify relative to each other.

It can thus be possible to make new aerodynamic jet influences from the initial metallic aerodynamic jet. It is therefore possible to avoid replacing the metallic aerodynamic jet as according to prior art solutions.

The method according to the invention can also comprise, independently or combined with each other, the following steps:
- making the part(s) to modify by stereolithography,
- coating the part(s) to modify, especially the first face of each part to modify, with a glue to secure it to the aerodynamic jet,
- placing a binding band in (a) groove(s) of the part(s) to modify to mechanically maintain the part(s) to modify on the aerodynamic jet,
- smoothing the intersection(s) between the part(s) to modify and the aerodynamic jet and/or between the parts to modify themselves and/or between a binding band and the part(s) to modify.

The aerodynamic jet, the turbomachine and the method according to the invention can include any of the previously mentioned characteristics, taken separately or according to any possible technical combinations with other characteristics.

BRIEF DESCRIPTION OF THE DRAWINGS

The invention will be better understood upon reading the detailed description that follows, the non-limiting exemplary implementations thereof, as well as upon examining the schematic and partial figures of the appended drawings, wherein.

In all these figures, identical references can represent identical or similar elements.

Besides, the different portions represented in the figures are not necessarily drawn to a uniform scale, to make the figures more legible.

DETAILED EXPOSURE OF PARTICULAR EMBODIMENTS

Exemplary embodiments of the part to modify and of an aerodynamic jet according to the invention will now be described in reference to FIGS. 1 to 5.

Figure 1:
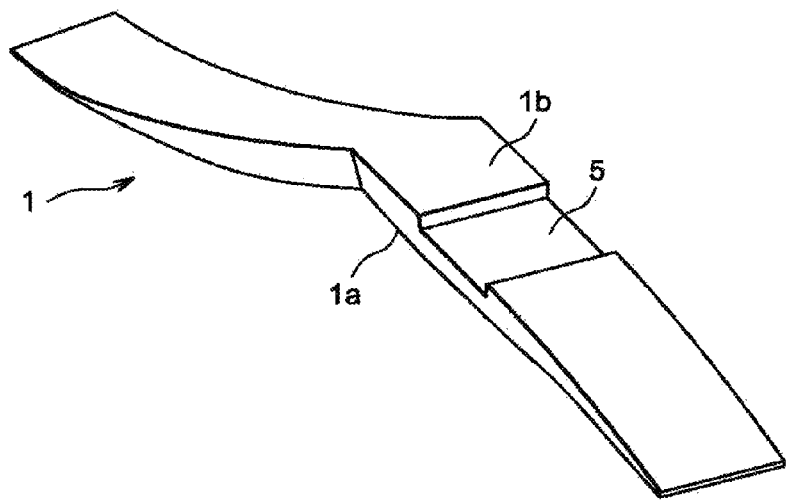
FIG. 1 shows a perspective view of an exemplary part to modify according to the invention.

FIG. 1 shows a perspective view of an exemplary part 1 to modify the profile of an aerodynamic jet 2 according to the invention.

The part 1, also hereinafter called "patch", comprises a first face 1a intended to be secured on the aerodynamic jet 2, and a second face 1b, opposite the first face 1a, which defines an aerodynamic jet profile modified relative to the initial profile of the portion of the aerodynamic jet 2 on which the first face 1a is intended to be secured.

The first face 1a of the patch 1 can especially be coated with a glue to allow its securing to the aerodynamic jet 2.

On the other hand, the patch 1 comprises a further groove 5 (or notch), which leads to both sides of the patch 1, to allow the positioning of an attachment strip or binding band 6 intended to create a mechanical support of the patch 1 on the aerodynamic jet 2. Such a mechanical support by the binding band 6 can especially be useful in case the patch 1 is unglued.

The patch 1 can be made of any kind of material. Preferably, the patch 1 is made by a method of stereolithography. The method of stereolithography can especially allow any desired shape for the patch 1 to be made, and optionally a patch 1 made of several portions secured to each other to be provided, especially through gluing so as to adapt to any kind of desired profile for the aerodynamic jet 2.

The materials made by stereolithography being particularly abrasion-sensitive and high temperature-sensitive, the turbomachine including a patch 1 can, if desired, be equipped with a filtering means for the air that will come into contact with the patch 1 to prevent abrasive dusts from coming into contact with the patch 1. Further, the patch 1 can be placed in a cold area of the turbomachine, especially in an area where the temperature is equal to or lower than 40° C.

Figure 2:
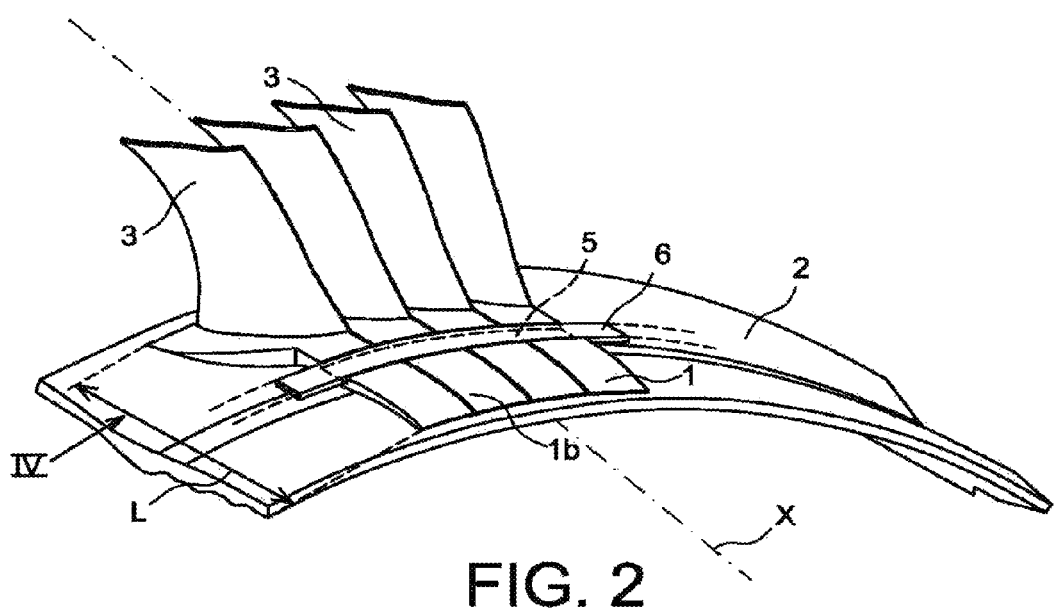
FIG. 2 shows a perspective view of an exemplary aerodynamic jet including the parts to modify according to the invention.

FIG. 2 shows a perspective view of an exemplary aerodynamic jet 2 comprising four patches 1 according to the invention.

By way of example only, the aerodynamic jet 2 can be an inlet guide vane (IGV) disk, which comprises guide blades 3.

The patches 1 can be arranged adjacent to each other, each patch 1 being sandwiched between two successive guide blades 3.

Figure 3:
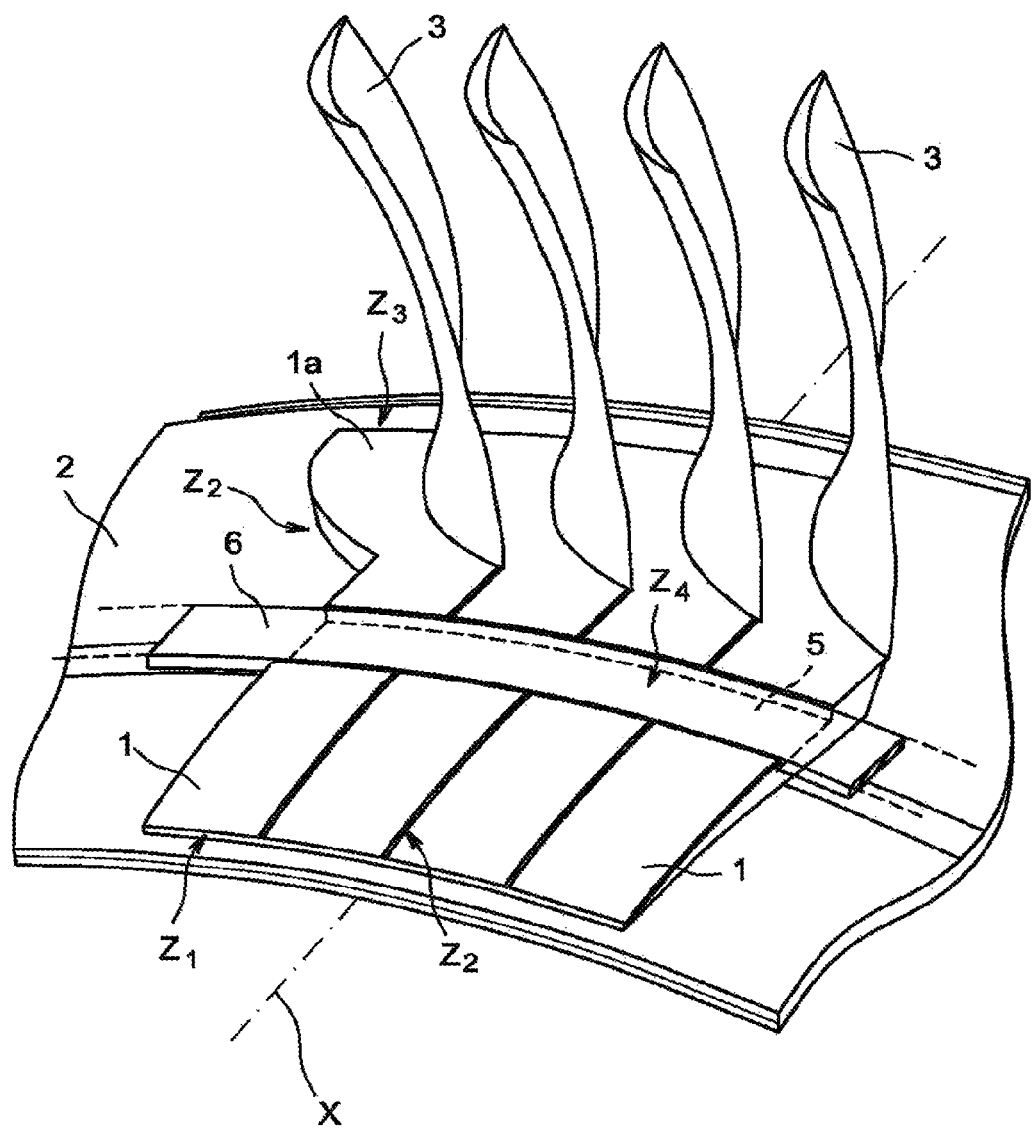
FIG. 3 is another perspective view of the aerodynamic jet of FIG. 2.
Figure 4:
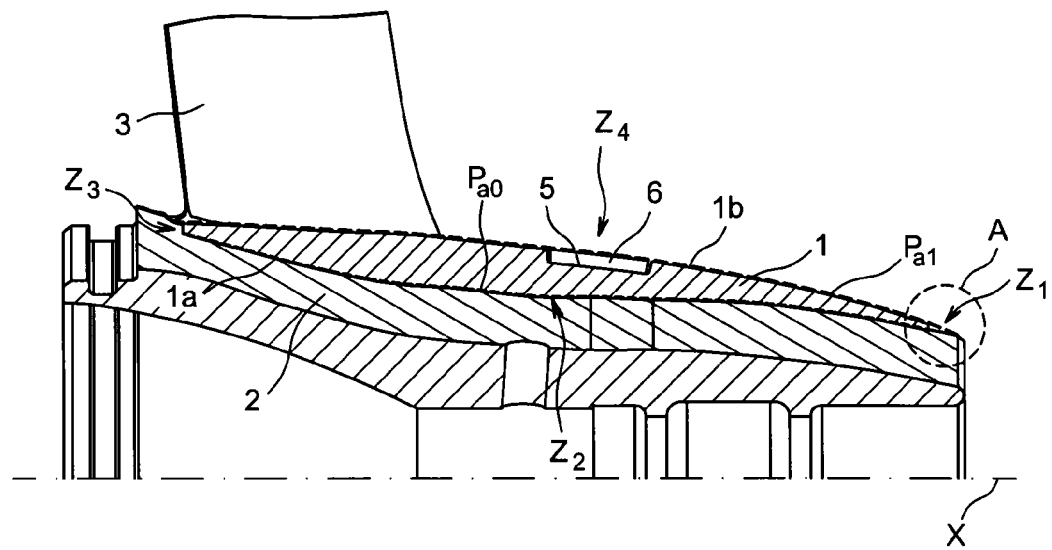
FIG. 4 is a view along IV of FIG. 2.

The patches 1 can extend along their largest dimension L, on the aerodynamic jet 2, along the turbomachine longitudinal axis X, as can be seen in FIGS. 2, 3 and 4.

The patches 1 can further be maintained in position on the aerodynamic jet 2 through gluing and also by a binding band 6, which can be seen in FIGS. 2 to 4, placed in the grooves 5 of the patches 1.

In this example, the four patches 1 are identical. However, the aerodynamic jet 2 can comprise identical or different patches.

As can be seen in FIGS. 3 and 4, the latter being a view along IV of FIG. 2, a smoothing can be provided in some areas of the patches 1 to allow a continuous reconstitution of the aerodynamic profile of the aerodynamic jet 2.

Particularly, such a smoothing can be provided in upstream $Z_1$ and downstream $Z_3$ areas of the patches 1, as well as in the intersection areas $Z_2$ between the patches 1 or between one patch 1 and the aerodynamic jet 2. The smoothing can also be provided at the areas $Z_4$ where the binding band 6 is accommodated in the grooves 5 of the patches.

The smoothing can for instance consists of adding an elastomeric material, especially an RN silicone elastomeric, so as to create a continuity between the patches 1 and/or a patch 1 and the aerodynamic jet 2 and/or between a groove 5 of a patch 1 and the binding band 6.

Figure 5:
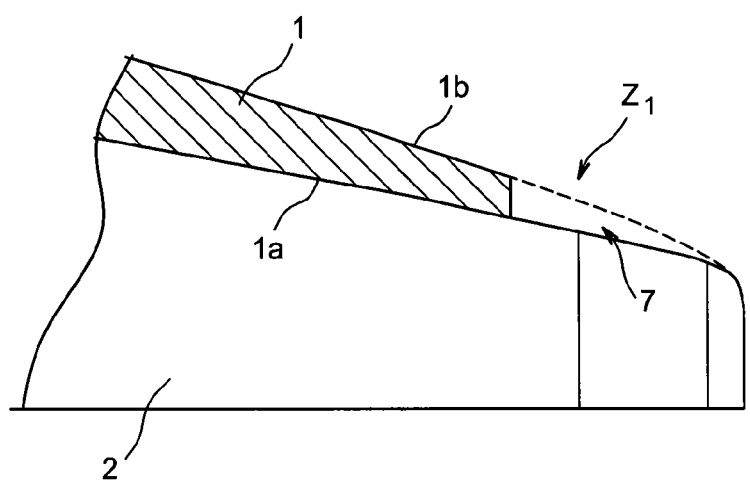
FIG. 5 is an enlarged view of a portion of FIG. 4.

FIG. 5 is an enlarged view of area A in FIG. 4, showing the smoothing carried out in an area $Z_1$ upstream of a patch 1 at the intersection between the patch 1 and the aerodynamic jet 2.

In this FIG. 5, adding an elastomeric material 7 is shown by the dotted lines and a surface continuity obtained between the patch 1 and the aerodynamic jet 2 can be observed, so as to reconstitute a continuous profile of the aerodynamic jet 2.

Thus, thanks to such a part to modify or patch 1 according to the invention supplied with a modified aerodynamic profile on its second face 1b, the invention can allow easy and quick modification of the aerodynamic jet 2 profile, once the patch 1 is positioned thereon by its first face 1a.

Particularly, the initial axial profile $P_{a0}$ of the aerodynamic jet 2 (which can be seen in FIG. 4), which is defined along the longitudinal axis X of the turbomachine before the part to modify 1 is positioned, can be modified by adding the part to modify 1, said part having a second face 1b defining a modified axial profile $P_{a1}$ (which can be seen in FIG. 4) for the aerodynamic jet 2.

The initial profile of the aerodynamic jet 2 can be easily adapted to achieve the new desired profile by increasing the number of patches 1 as needed, which patches 1 can be placed or not next to each other and/or at least partially superimposed on each other.

Of course, the invention is not limited to the exemplary embodiment that has just been described. Various modifications can be made by a person skilled in the art.

The term "including a" must be understood as being a synonym of "including at least one", unless otherwise specified.

The invention claimed is:

1. An aerodynamic jet for a turbomachine, having an initial axial profile defined along a longitudinal axis of the turbomachine, comprising:
   a part to modify the initial profile of the aerodynamic jet, including:
      a first face configured to be secured on the aerodynamic jet, and
      a second face defining a modified aerodynamic jet profile, configured to modify at least the initial axial profile of the aerodynamic jet, wherein
   the part to modify the initial profile of the aerodynamic jet includes a first structural portion that contours a curved surface of a guide blade of the aerodynamic jet, and a second structural portion that extends upstream from an upstream end of the guide blade and that is aligned along the longitudinal axis of the turbomachine.

2. The aerodynamic jet for the turbomachine according to claim 1, wherein the part to modify the initial profile of the aerodynamic jet extends along its largest dimension, on the aerodynamic jet, along the longitudinal axis of the turbomachine.

3. The aerodynamic jet for the turbomachine according to claim 1, wherein the first face of the part to modify the initial profile of the aerodynamic jet fits closely the initial axial profile of at least one portion of the aerodynamic jet.

4. The aerodynamic jet for the turbomachine according to claim 1, wherein the part to modify the initial profile of the aerodynamic jet further includes a groove to accommodate a binding band configured to maintain the part to modify the initial profile of the aerodynamic jet in position on the aerodynamic jet.

5. The aerodynamic jet for the turbomachine according to claim 1, wherein the part to modify the initial profile of the aerodynamic jet is made by stereolithography.

6. The aerodynamic jet for the turbomachine according to claim 1, comprising a plurality of parts to modify the initial profile of the aerodynamic jet, arranged in a juxtaposition relative to each other, transversely relative to the longitudinal axis of the turbomachine to ensure a continuity of the modified aerodynamic jet profile on at least one transverse section of the aerodynamic jet.

7. The aerodynamic jet for the turbomachine according to claim 1, wherein the aerodynamic jet is an outlet (OGV) or inlet (IGV) guide vane.

8. A turbomachine comprising the aerodynamic jet for the turbomachine according to claim 1.

9. A method for modifying a profile of an aerodynamic jet, comprising securing the part to modify the initial profile of the aerodynamic jet for the turbomachine according to claim 1 on the aerodynamic jet.

10. The method according to claim 9, further comprising smoothing at least at one intersection between the part to modify the initial profile of the aerodynamic jet and the aerodynamic jet.

11. The aerodynamic jet for the turbomachine according to claim 1, wherein a portion of the second face that is on the second structural portion includes a groove to accommodate a binding band configured to maintain the part to modify the initial profile of the aerodynamic jet in position on the aerodynamic jet.

12. The aerodynamic jet for the turbomachine according to claim 1, wherein a portion of the second face that is on the second structural portion includes a convex profile.

13. The aerodynamic jet for the turbomachine according to claim 1, wherein a portion of the second face that is on the first structural portion includes a concave profile.

14. The aerodynamic jet for the turbomachine according to claim 1, wherein a downstream end of the first structural portion does not extend past a downstream end of the guide blade of the aerodynamic jet.

15. The aerodynamic jet for the turbomachine according to claim 1, wherein the first structural portion includes a thickness in a radial direction that tapers toward a downstream end of the part to modify the initial profile of the aerodynamic jet.

16. The aerodynamic jet for the turbomachine according to claim 1, wherein the second structural portion includes a thickness in a radial direction that tapers toward an upstream end of the part to modify the initial profile of the aerodynamic jet.

* * * * *

UNITED STATES PATENT AND TRADEMARK OFFICE
CERTIFICATE OF CORRECTION

PATENT NO. : 9,982,546 B2
APPLICATION NO. : 14/413508
DATED : May 29, 2018
INVENTOR(S) : Gregory Nicolas Gerald Gillant et al.

Page 1 of 1

It is certified that error appears in the above-identified patent and that said Letters Patent is hereby corrected as shown below:

In the Specification

In Column 4, Line 35, delete "surperimposedly" insert --superimposedly--.

In Column 6, Line 19, delete "RN" insert --RTV--.

In the Claims

In Column 8, Line 23, Claim 14, delete "j et." and insert --jet.--.

Signed and Sealed this
Second Day of June, 2020

Andrei Iancu
*Director of the United States Patent and Trademark Office*